United States Patent [19]

Lagne

[11] Patent Number: 5,048,618

[45] Date of Patent: Sep. 17, 1991

[54] HAMMER MACHINE

[75] Inventor: Jöran U. Lagne, Saltsjöbaden, Sweden

[73] Assignee: Berema Aktiebolag, Solna, Sweden

[21] Appl. No.: 489,220

[22] Filed: Mar. 6, 1990

[30] Foreign Application Priority Data

Mar. 16, 1989 [SE] Sweden ............................... 8900947

[51] Int. Cl.$^5$ ............................................ B23B 45/16

[52] U.S. Cl. .................................................... 173/139

[58] Field of Search .................. 173/122, 139; 92/172, 92/185

[56] References Cited

U.S. PATENT DOCUMENTS

| | | | |
|---|---|---|---|
| 2,121,706 | 6/1938 | Little | 173/122 |
| 2,677,355 | 9/1954 | Manner et al. | 173/122 X |
| 3,642,077 | 2/1972 | Bayard | 173/122 X |

FOREIGN PATENT DOCUMENTS 1207900 12/1965 Fed. Rep. of Germany .

*Primary Examiner*—Timothy V. Eley

*Assistant Examiner*—Willmon Fridie, Jr.

*Attorney, Agent, or Firm*—Eric Y. Munson; Mark P. Stone

[57] ABSTRACT

A hammer machine comprises a machine housing (10) with a cylinder (11) in which a reciprocating drive piston (40) via a gas cushion (44) drives a hammer piston (15) to impact on respectively to move away from a tool (20) carried by the housing (10). The movement of the hammer piston (15) away from the tool (20) is supported by underpressure in the gas cushion (44) and rebound. A connecting passage (52) in the drive piston (40), the cylinder (11) or the hammer piston (15) comprises a one-way valve (57) and a throttling means (53) via which the gas cushion (44) is replenished by ambient air for regulating the gas cushion pressure during operation of the drive piston. The one-way valve (57) closes to prevent escape of gas from the gas cushion (44). A damping cylinder (51) in communication with the connecting passage (52) can be provided on one of the pistons (40;15), which, when the piston tend to collide, sealingly cooperates with a damping pistons (50) on the other piston (15;40) so as to prevent collision.

11 Claims, 1 Drawing Sheet

HAMMER MACHINE

Figure 1:
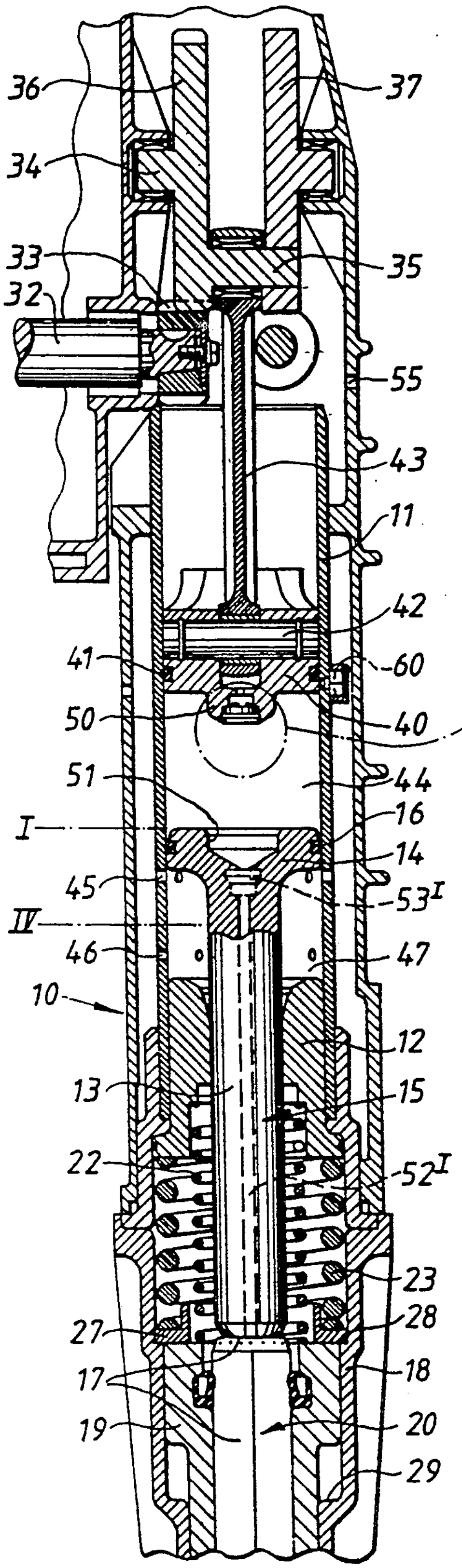

The present invention relates to a hammer machine of the type comprising a housing with a cylinder therein in which a reciprocating drive piston via a gas cushion in a working chamber of said cylinder repeatedly drives a hammer piston to impact on a tool carried by the machine housing.

In these usually hand held machines the hammer piston works as a free piston in the system and has its turning points in the working chamber subjected to great variations. These depend for example on varying recoil upon impact against the tool, variations in the supply of power from the motor, the position of the neck of the tool at impact, the hardness of the material worked upon, and the feeding force applied by the operator. The movements of the system can therefore be treated theoretically only in a very coarse way and cannot be simulated in a satisfactory way by calculation. A problem is that the movements described by the pistons from time to time overlap one another in the cylinder during changes of the turning point, which under unfavourable circumstances can cause collision between the pistons and total breakdown of the machine. One such unfavourable situation can occur when the drive piston during its working stroke meets an extra powerful recoil of the hammer piston against the tool concurrently with air excessively leaking from the gas cushion for example due to worn piston rings and resultant inadequate sealing of the working chamber.

In earlier efforts to avoid piston collision, cooperating damping piston and cylinder means have been provided on the main pistons of the system, as shown for example in the U.S. Pat. specifications Nos. 1,551,989 and 1,827,877. In such a solution, however, the damping elements, if given sufficient mutual tightness, tend to adhere to one another due to suction which hampers movement of the main pistons.

In another effort to avoid machine breakdown, the gas cushion, as shown in U.S. Pat. specification No. 2,732,219, has been connected to the exterior of the cylinder via a passage in the drive piston closed by a melt-fuse. Heat generated in the gas cushion during extreme compression and imminent collision melts away the fuse and opens the drive piston passage whereby the impact power is reduced and the operator gets a warning to stop the machine. During operational movement of the system these machines demand that a certain underpressure repeatedly is created in the gas cushion in order to assure that the hammer piston is lifted up towards the drive piston at weakened hammer piston recoil or from its idle position on the tool at starting. At the same time the underpressure is not allowed to become so low that one would risk piston collision upon recoil. Air is therefore allowed to leak via a calibrated throttling aperture in the cylinder wall into the gas cushion so as to limit arising underpressure. The difficulty is to find the ideal position for the throttling aperture in order to meet in a satisfactory way upcoming piston movement variations. At increased leakage through wear and with the addition of leakage losses through the aperture itself, in particular at extreme turning points, the function of the throttling aperture is changed and experience indicates, particularly regarding more powerful machines, that piston collision can happen without the temperature in the gas cushion becoming high enough to melt the fuse. An additional disadvantage are the work interruptions for fuse changing in cases when the intended melting in fact occurs and the machine has been stopped in time.

It is an object of the invention to increase the safety against piston collision in order to reduce the risk of machine breakdown and to eliminate work interruptions of the above character. That object is attained by the characterizing features of the claims following hereinafter.

Figure 2:
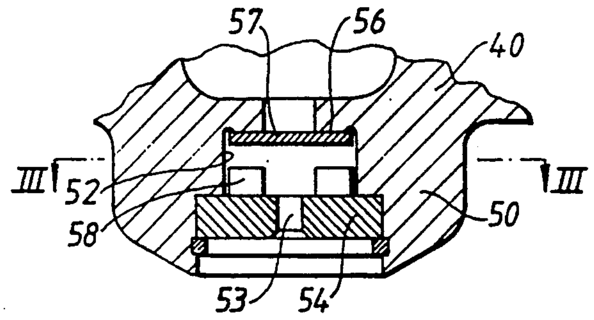
Figure 3:
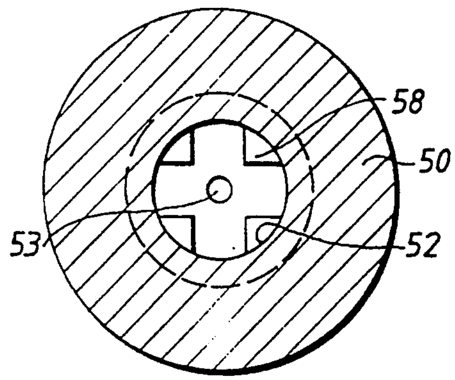

An embodiment as well as some modifications of the invention will be described hereinafter with reference to the accompanying drawing, wherein FIG. 1 shows a longitudinal section through a hammer machine embodying the invention. FIG. 2 shows an enlarged view of a portion designated II of the drive piston in FIG. 1. FIG. 3 shows a view on the line III—III in FIG. 2.

The hammer machine comprises a usually hand held machine housing 10 with a cylinder 11 in which a hammer piston 15 is slidably guided and sealed by a preferably cast iron piston ring 16 surrounding the piston head 14. The piston rod 13 passes slidably and sealingly through the end 12 of the cylinder 11 and delivers impacts against the neck 17 of the tool 20, for example a chisel, tamper or drill, which by a collar, not shown in FIG. 1, rests axially against a tool sleeve 19 with the neck 17 slidably guided therein. The tool sleeve 19 is axially slidably guided in the forward end 18 of the machine housing 10 and abuts in working position against a ring 27. A recoil spring 23 is strongly tensioned between the cylinder end 12 and the ring 27, the latter being kept pressed against a shoulder 28 inside of the forward end 18. The recoil spring 23 is to an applicable extent made according to U.S. Pat. specification No. 3,918,535 and its function is described in more detail therein. A tool spring 22 is inserted between the cylinder end 12 and the tool sleeve 19 and tends to move the tool 20 in forward and to position the sleeve 19 in inoperative position against a shoulder 29 inside of the forward end 18. In such position the hammer piston 15 will sink from the impact position in FIG. 1 designated by numeral I to the position of rest designated by IV.

The housing 10 comprises a motor, not shown, which, depending on the intended use, may be a combustion engine, an electric motor or a hydraulic motor. The motor drives a shaft 32 and a gear wheel 33 thereon is geared to rotate a crank shaft 34 journalled in the upper part of the machine housing 10. The crank pin 35 of the crank shaft 34 is supported by circular end pieces 36,37 of which one is formed as a gear wheel 36 driven by the gear wheel 33.

A driving piston 40 is slidably guided in the cylinder 11 and similarly to a compressor piston sealed thereagainst by a piston ring 41, preferably of cast iron so as to provide better conducting-away of heat. A piston pin 42 in the drive piston 40 is pivotally coupled to the crank pin 35 via a connecting rod 43. Between the drive piston 40 and the hammer piston head 14 the cylinder 11 forms a working chamber 44 in which a gas cushion transmits the movement of the drive piston 40 to the hammer piston 15. The working chamber 44 communicates with the ambient air via a series of radial openings 45 in the wall of cylinder 11 when the hammer piston 15 takes the position IV. Some distance below the position IV there is provided in the cylinder wall 14 a second series of ventilated openings 46, below which a braking chamber 47 is formed in the cylinder 11. The braking chamber 47 catches the hammer piston 15 pneumatically upon unresisted blows in the forward direction when the tool 20 happens to be in forwardly projected position or is removed.

The drive piston carries centrally thereon an axially protruding damping piston 50 of reduced diameter which, when the pistons meet, is caught pneumatically in a damping cylinder 51 centrally on the hammer piston 15. The damping cylinder 51 sealingly cooperates with the damping piston 50 to prevent collision between the drive piston 40 and the hammer piston 15. The play between the damping diameters is to be chosen as small as practically possible by reduction of piston tolerances and should preferably be in the magnitude of 0.1 mm. As best seen in FIG. 2, a trough connecting passage 52 is provided centrally in the damping piston 50 by which the working chamber 44 is connected to the ambient air via an opening 55 in the machine housing 10 overlying the cylinder 11. A throttling means such as washer 54 with a throttling aperture 53 is disposed in the passage 52. As an alternative the connecting passage 52 can be provided in the hammer piston 15 as indicated by broken lines and the designation 52' in FIG. 1, although such an arrangement would demand increased sealing in order to prevent penetration of dirt. It is also evident that the damping piston and cylinder 50,51 in case of need may be arranged in mutually changed positions.

As shown in FIG. 2 there is utilized an inner valve seat 56 in the connecting passage 52 for purposes of forming, in cooperation with a disk valve 57, a one-way valve which by the induced gas stream in the passage 52 either is forced to close on the seat 56 or is placed against lugs 58 on the washer 54 forming a leaking valve seat that overlies the throttling aperture 53. As an alternative, the one-way valve 57 can be associated with the modified disposition of the throttling aperture 53' in the hammer piston 15. A further alternative position of the connecting passage 52 and the one-way valve 57, namely in the wall of cylinder 11, is designated by the numeral 60 in FIG. 1. That modification will depend in its function on the upper turning point the hammer piston 15 happens to take in operation, which in extreme cases can lead to increased development of heat.

When starting, the operator by the machine housing 10 stems the tool 20 against the working face so that the tool sleeve 19 is pressed against the ring 27 and the hammer piston 15 takes the position I. The throttling aperture 53; 53';60 is calibrated to allow a suitable quantity of air to be sucked into the working chamber 44 via the open one-way valve 57 during the return movement of the drive piston 40, whereupon a gas cushion under increased pressure is formed in the working chamber 44 during the subsequent working stroke of the drive piston 40, i.e. under its movement in forward-downward direction in FIG. 1. The one-way valve 57 closes immediately upon such movement. The increased pressure causes certain leakage past the piston rings 16,41. With correct calibration of the throttling aperture there is assured that during the gas suction phase of the return stroke there is created an underpressure in the working chamber 44 active to lift the hammer piston 15 upwards and to then cause it to hit the tool 20 as a result of the following working stroke compression of the gas cushion. The recoil of the hammer piston 15 contributes during normal work to its movement away from the tool 20 while the underside of the piston head 14 is ventilated freely by the two rows of openings 45,46 of the cylinder 11.

The instant one runs the risk of piston collision, the damping piston 50 of the drive piston 40, in entering the damping cylinder 51, becomes active, separates the throttling aperture 53 from the working chamber 44 as such, and instantly closes the one-way valve 57. With appropriate calibration of the aperture 53 and the one-way valve 57 closed, there is created a calculatable sufficient increase of pressure in the damping cylinder 51 so as to hinder collision. The leakage from the working chamber 44 as such past worn piston rings 16,41 will be unable to prevent efficient damping.

The one-way valve 57 closes on the seat 56 during the working stroke of the drive piston 40 as well as when the damping piston 50 is about to prevent piston collision during the return stroke. Thus a higher collision preventing pressure can be built up in the damping cylinder 51 of the hammer piston 15 so that an increased safety against breakdown is gained enabling an increase in machine tool power. Immediate opening of the one-way valve 57 after damping eliminates suctional adherence between the damping elements and allows the main pistons 15,40 to move away freely from each other.

I claim:

1. A hammer machine comprising a housing (10) with a cylinder (11) therein in which a reciprocating drive piston (40) via a gas cushion in a working chamber (44) of said cylinder (11) repeatedly drives a hammer piston (15) to impact on a tool (20) carried by the machine housing, characterized in that a connecting passage (52) in flow line with a throttling means (53) and a one-way valve (57) comprises means for providing fluid communication between gas external to said cylinder and said working chamber for allowing gas external to the cylinder (11) to pass freely via said throttling means (53) and aid one-way valve (57) into said working chamber (44), and for preventing flow of gas in the opposite direction, said driving piston and said hammer piston comprising main pistons, one of said main pistons having an axially protruding damping piston (50) of a diameter less than that of said one main piston from which it protrudes, said damping piston being adapted to prevent piston encounter collision by arresting the return movement of said hammer piston (15) towards said drive piston (40) in a cooperating damping cylinder (51) provided on said other one of said main pistons, said damping cylinder being adapted for substantially sealingly receiving said damping piston therein, said connecting passage (52) opening out towards said damping cylinder (51).

2. The hammer machine of claim 1, wherein said valve comprises a valve disk (57) operated by the gas flow in said connecting passage (52), said disk (57) having a sealing seat (56) at the side thereof directed away from said working chamber (44) and a leaking seat (58) at the opposite side thereof.

3. The hammer machine according to claim 1, wherein said connecting passage (52) extends axially through said driving piston (40).

4. The hammer machine according to claim 2, wherein said connecting passage (52) extends axially through said driving piston (40).

5. The hammer machine as claimed in claim 1 wherein said damping piston protrudes from said drive piston, and said damping cylinder is provided on said hammer piston.

6. The hammer machine as claimed in claim 1 including means for closing said one-way valve for preventing gas from entering or exiting from said working chamber for increasing gas pressure in said working chamber and said damping cylinder during relative movement of said main pistons toward each other to increase the damping effect of said damping piston and said damping cylinder.

7. The hammer machine of claim 1 including means for opening said one-way valve to allow gas external to said cylinder to enter said working chamber and said damping cylinder during relative movement of said main pistons apart from each other for reducing suctional adherence between said damping piston and said damping cylinder.

8. A hammer machine comprising a cylinder, a drive piston and a hammer piston movably guided within said cylinder; said drive piston and said hammer piston having opposed faces and defining a working chamber within said cylinder between said opposed faces, said drive piston being adapted to drive said hammer piston via a gas cushion in said working chamber; one of said opposed faces having a damping piston axially extending therefrom, said damping piston being reduced in diameter relative to said face from which said damping piston extends; a damping cylinder provided on said other one of said opposed faces for substantially sealingly receiving said damping piston therein; and means 1). for increasing damping for preventing collisions between said hammer piston and said drive piston when said hammer and drive pistons are relatively movable toward each other and 2). for reducing suctional adherence between said damping piston and said damping cylinder when said hammer and drive pistons are relatively movable apart from each other; said means including a valve, a throttle, and connecting passages between said valve and said throttle for selectively providing fluid communication between said working chamber and gas external to said cylinder for preventing flow of said gas into said working chamber and said damping cylinder when said drive piston and said hammer piston are relatively movable towards each other, and for permitting flow of said gas into said working chamber and said damping cylinder when said drive piston and said hammer piston are relatively movable towards each other, and for permitting flow of said gas into said working chamber and said damping cylinder when said drive piston and said hammer piston are relatively movable apart from each other.

9. The hammer machine as claimed in claim 8 wherein said connecting passage is oriented to extend axially through said driving piston.

10. The hammer machine as claimed in claim 8 wherein said damping piston extends from said face of said drive piston, and said damping cylinder is defined in said face of said hammer piston.

11. The hammer machine of claim 8 wherein said connecting passage is oriented to open cut towards said damping cylinder.

* * * * *